(12) United States Patent
Monroe et al.

(10) Patent No.: US 11,072,088 B2
(45) Date of Patent: Jul. 27, 2021

(54) THREE-DIMENSIONAL PRINTER

(71) Applicant: Hewlett-Packard Development Company, L.P., Houston, TX (US)

(72) Inventors: Michael G Monroe, Philomath, OR (US); Vladek Kasperchik, Corvallis, OR (US); Pavel Kornilovich, Corvallis, OR (US); David A Champion, Lebanon, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 297 days.

(21) Appl. No.: 15/765,088

(22) PCT Filed: Jan. 29, 2016

(86) PCT No.: PCT/US2016/015841
§ 371 (c)(1),
(2) Date: Mar. 30, 2018

(87) PCT Pub. No.: WO2017/131790
PCT Pub. Date: Aug. 3, 2017

(65) Prior Publication Data
US 2020/0198178 A1      Jun. 25, 2020

(51) Int. Cl.
*B28B 1/00* (2006.01)
*B33Y 10/00* (2015.01)
(Continued)

(52) U.S. Cl.
CPC ............ *B28B 1/001* (2013.01); *B28B 11/243* (2013.01); *B28B 17/0081* (2013.01);
(Continued)

(58) Field of Classification Search
CPC ............ B22F 3/16; B22F 3/004; B29C 43/14
See application file for complete search history.

(56) References Cited

U.S. PATENT DOCUMENTS 5,204,055 A * 4/1993 Sachs ...................... B05C 19/04
                                                           419/2
5,900,207 A    5/1999 Danforth et al.
(Continued)

FOREIGN PATENT DOCUMENTS

| WO | WO-2015180703 | 5/2014 |
| WO | WO-2015-082923 | 6/2015 |
| WO | WO-2015115897 | 8/2015 |

OTHER PUBLICATIONS

3D Printing Material: Ceramic. 5 pages.

*Primary Examiner* — Jacob T Minskey
*Assistant Examiner* — Virak Nguon
(74) *Attorney, Agent, or Firm* — Mannava & Kang

(57) ABSTRACT

According to an example, a three-dimensional (3D) printer may include a spreader to spread build material granules into a layer on a build area platform, a pressing die positioned above the layer of spread build material granules, in which the pressing die is to apply pressure onto the layer of build material granules to fragment the build material granules into primary particles to increase the density of the layer of build material granules, and a printhead to selectively deposit a fusing agent between the primary particles of the spread layer of build material granules.

21 Claims, 5 Drawing Sheets

(51) Int. Cl.
- *B33Y 30/00* (2015.01)
- *B28B 11/24* (2006.01)
- *B28B 17/00* (2006.01)
- *B33Y 50/02* (2015.01)

(52) U.S. Cl.
CPC .............. *B33Y 10/00* (2014.12); *B33Y 30/00* (2014.12); *B33Y 50/02* (2014.12)

(56) References Cited

U.S. PATENT DOCUMENTS

| | | |
|---|---|---|
| 8,568,649 B1 * | 10/2013 | Balistreri ................ B32B 18/00 |
| | | 264/642 |
| 8,741,050 B2 | 6/2014 | Brodkin et al. |
| 8,741,194 B1 * | 6/2014 | Ederer .................... B22C 23/00 |
| | | 264/113 |
| 2005/0087903 A1 | 4/2005 | Farr et al. |
| 2008/0063867 A1 | 3/2008 | Schlienger et al. |
| 2012/0237745 A1 | 9/2012 | Dierkes et al. |
| 2015/0104346 A1 * | 4/2015 | Nakamura ............ B22F 3/1055 |
| | | 419/55 |
| 2015/0197063 A1 | 7/2015 | Shinar et al. |
| 2015/0321255 A1 | 11/2015 | Colin |
| 2016/0158962 A1 * | 6/2016 | Balistreri ................ B33Y 70/00 |
| | | 428/548 |
| 2017/0144372 A1 * | 5/2017 | Kuesters .................. B22F 3/16 |

\* cited by examiner

THREE-DIMENSIONAL PRINTER

BACKGROUND

In three-dimensional (3D) printing, an additive printing process may be used to make three-dimensional solid parts from a digital model. 3D printing may be used in rapid product prototyping, mold generation, mold master generation, and short run manufacturing. Some 3D printing techniques are considered additive processes because they involve the application of successive layers of material. This is unlike traditional machining processes, which often rely upon the removal of material to create the final part. In 3D printing, the building material may be cured or fused, which for some materials may be performed using heat-assisted extrusion, melting, or sintering, and for other materials, may be performed using digital light projection technology.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
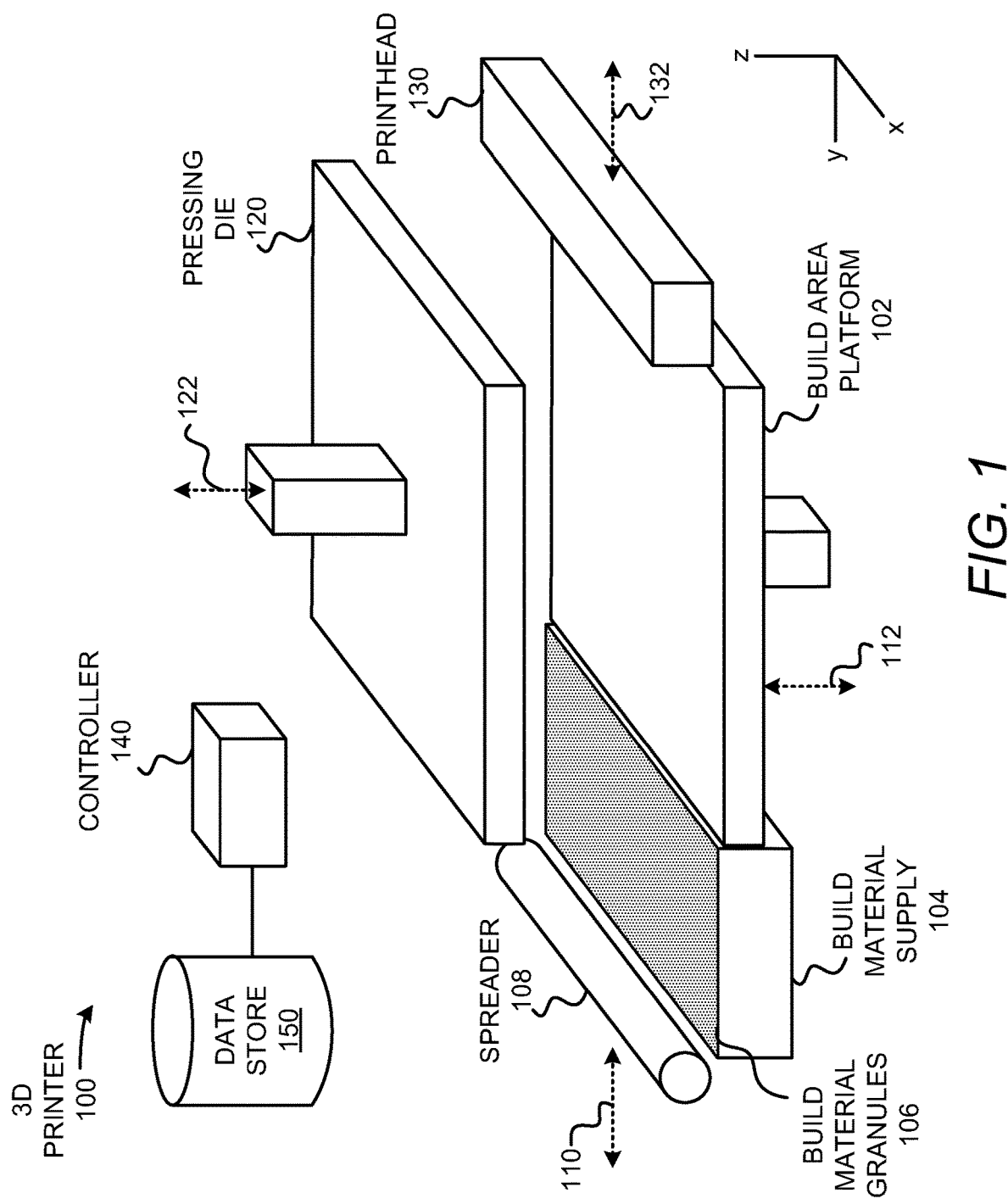
FIG. 1 shows a simplified isometric view of an example three-dimensional (3D) printer for generating, building, or printing three-dimensional parts.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Disclosed herein are a 3D printer, methods for implementing the 3D printer to form a 3D part, and a management apparatus for controlling operations of the 3D printer. A 3D object may be printed, formed, or otherwise generated onto a build area platform. The 3D printer may also include a spreader to spread build material granules, which may be formed of primary particles bound together with a binder, into a layer onto the build area platform, a pressing die positioned above the build area platform that is to apply pressure onto the layer of build material granules to fragment the build material granules into the primary particles to increase the density of the layer of build material granules, and a printhead to selectively deposit a fusing agent between the primary particles of the spread layer of build material granules. The 3D printer may form successive layers of the build material granules, which may each be spread, pressed, and receive fusing agent to form a green body of the 3D part that is ultimately to be formed. The green body may be removed from the extra build material granules that do not form part of the green body and may then be exposed to heating and/or radiation to melt or sinter, densify, fuse, and harden the green body to form the 3D part. As used herein "3D printed part," "3D part," "3D object," "object," or "part" may be a completed 3D printed part or a layer of a 3D printed part.

According to an example, the build material granules are formed of a ceramic material. Sintering temperatures (T) for a majority of ceramic materials are approximately 60-80% of their respective melting temperatures. Because many of the ceramic materials have melting temperatures close to or greater than 2000° C., the sintering temperatures of such ceramic materials typically exceed 1000° C. For example, alumina, which has a melting temperature that is greater than 2000° C., has a practical sintering temperature range of about 1400-1600° C.). In this regard, in order to sinter a majority of sub-micron sized ceramic material particle types, the particles may be placed in close contact to each other and be exposed to temperatures above about 1400° C. In addition, ceramic material powders are typically less "flowable" when the particles are very small, e.g., less than 10 μm. In one regard, the purpose of the build material granule is to create a powder that is flowable and sinterable. As disclosed herein, the build material granules are fabricated to have sizes that are at least about 10 μm in size to enable the powder formed from the build material granules to be able to have beneficial flow properties, thus enabling very uniform and thin layers of the powder to be formed during the spreading of the build material granules. Each of the build material granules may be composed of primary particles and a thermally-decomposable binder that holds the primary particles together. Examples of the build material granules are described in greater detail herein below.

In addition, through pressing of the layer of build material granules, the build material granules may be fragmented into their primary particles. In this regard, the primary particles may be pressed to be in closer proximities to each other, thereby increasing the density of the layer of build material granules. For instance, the build material granules are reduced to their primary particles, which may have sub-micron sizes. The pressing of the build material granules may also cause more of the sub-micron sized particles to be in direct contact with each other and to be compacted to form a stabilized surface for printing with the fusing agent. Moreover, the sub-micron sizes of the particles may enable complete solid state sintering after the green body is formed by printing.

Through implementation of the 3D printer, materials, such as ceramic materials, may be formed into a fully densified and sintered 3D part while still being able to flow easily and be spread in uniform layers to receive the fusing agent. Accordingly, fine part details in 3D parts may be formed in a powder bed process.

With reference first to FIG. 1, there is shown a simplified isometric view of an example three-dimensional (3D) printer 100 for generating, building, or printing three-dimensional parts. It should be understood that the 3D printer 100 depicted in FIG. 1 may include additional components and that some of the components described herein may be removed and/or modified without departing from a scope of the 3D printer 100 disclosed herein. It should also be understood that the components of the 3D printer 100 depicted in FIG. 1 may not be drawn to scale and thus, the 3D printer 100 may have a different size and/or configuration other than as shown therein.

The 3D printer 100 is depicted as including a build area platform 102, a build material supply 104 containing build material granules 106, and a spreader 108. The build area platform 102 may be integrated with the 3D printer 100 or may be a component that is separately insertable into the 3D printer 100, e.g., the build area platform 102 may be a module that is available separately from the 3D printer 100. The build material supply 104 may be a container or surface that is to position build material granules 106 between the spreader 108 and the build area platform 102. The build material supply 106 may be a hopper or a surface upon which the build material granules 106 may be supplied, for instance, from a build material source (not shown) located above the build material supply 104. Additionally, or alternatively, the build material supply 104 may include a mechanism to provide, e.g., move, the build material granules 106 from a storage location to a position to be spread onto the build area platform 102 or a previously formed layer of build material granules 106. For instance, the build material supply 104 may include a hopper, an auger conveyer, or the like. Generally speaking, 3D objects or parts are to be generated from the build material granules 106 as discussed herein.

The spreader 108 is to be moved in a direction as denoted by the arrow 110, e.g., along the y-axis, over the build material supply 104 and across the build area platform 102 to spread a layer of the build material granules 106 over a surface of the build area platform 102. The spreader 108 may also be returned to a position adjacent the build material supply 104 following the spreading of the build material granules 106. The spreader 108 may be a doctor blade, roller, and/or any other device suitable for spreading the build material granules 106 over the build area platform 102. For instance, the spreader 108 may be a counter-rotating roller.

The 3D printer 100 is also depicted as including a pressing die 120 positioned in spaced relation to the build area platform 102 along the z-axis. The pressing die 120 may be lowered as denoted by the arrow 122, e.g., along the z-axis, to contact and apply pressure onto a layer of the build material granules 106 that has been formed on the surface of the build area platform 102. According to an example, the pressing die 120 may apply sufficient pressure onto the layer of the build material granules 106 to fragment the build material granules 106 into primary particles of the build material granules 106 to increase the density of the building material granules 106. That is, the pressing die 120 may apply sufficient pressure to crush or break down the building material granules 106 into the primary particles such that the building material granules 106 have relatively smaller sizes and thus, smaller gaps may be formed between the primary particles of the building material granules 106.

By way of particular example, the build material granules 106 are ceramic build material granules and the pressing die 120 may apply sufficient pressure onto the ceramic build material granules to cause a majority of the ceramic build material granules to be fragmented. In this example, the ceramic build material granules may have particle sizes that are greater than 10 µm, e.g., between about 10 µm to about 75 µm, prior to being pressed by the pressing die 120 and may have particle sizes that are less than about 0.5 µm, e.g., between about 0.1 µm and 0.5 µm, following application of the pressure from the pressing die 120.

The 3D printer 100 is further depicted as including a printhead 130 that is to be scanned across the build area platform 102 in the direction indicated by the arrow 132, e.g., along the y-axis. The printhead 130 may be, for instance, a thermal inkjet printhead, a piezoelectric printhead, etc., and may extend a width of the build area platform 102. Although a single printhead 130 has been depicted in FIG. 1, it should be understood that multiple printheads may be used that span the width of the build area platform 102. Additionally, the printheads 130 may be positioned in multiple printbars. The printhead 130 may also be scanned along the x-axis, for instance, in configurations in which the printhead 130 does not span the width of the build area platform 102 to thus enable the printhead 130 to deposit a fusing agent over a large area of a layer of build material granules 106. The printhead 132 may thus be attached to a moving XY stage or a translational carriage (neither of which is shown) that moves the printhead 130 adjacent to the build area platform 102 in order to deposit a fusing agent in predetermined areas of a layer of the build material granules 106 that has been formed on the build area platform 102. The printhead 130 may include a plurality of nozzles (not shown) through which the fusing agent is to be ejected.

Following deposition of the fusing agent into selected areas of the layer of the build material granules 106, the build area platform 102 may be lowered as denoted by the arrow 112, e.g., along the z-axis. In addition, the spreader 108 may be moved across the build area platform 102 to form a new layer of build material granules 106 on top of the previously formed layer. Moreover, the pressing die 120 may be pressed onto the new layer of build material granules 106 to increase the density of the new layer of build material granules 106 and the printhead 130 may deposit fusing agent onto predetermined areas of the new layer of build material granules 106. The above-described process may be repeated until a predetermined number of layers have been formed to fabricate a green body of a desired 3D part.

As also shown in FIG. 1, the 3D printer 100 may include a controller 140 that may control operations of the build area platform 102, the build material supply 104, the spreader 108, the pressing die 120, and the printhead 130. Particularly, for instance, the controller 140 may control actuators (not shown) to control various operations of the 3D printer 100 components. The controller 130 may be a computing device, a semiconductor-based microprocessor, a central processing unit (CPU), an application specific integrated circuit (ASIC), and/or other hardware device. Although not shown the controller 130 may be connected to the 3D printer 100 components via communication lines.

The controller 140 is also depicted as being in communication with a data store 150. The data store 150 may include data pertaining to a 3D part to be printed by the 3D printer 100. For instance, the data may include the locations in each build material granule 106 layer that the printhead 130 is to deposit a fusing agent to form the green body of the 3D part. In one example, the controller 140 may use the data to control the locations on each of the build material granule 106 layers that the printhead 122 deposits the fusing agent. The data store 150 may also include machine readable instructions that are to cause the controller 140 to control the supply of build material granules 106 by the build material supply 104, the movement of the print build area platform 102, the movement of the spreader 108, the movement of the pressing die 120, etc.

Figure 2:
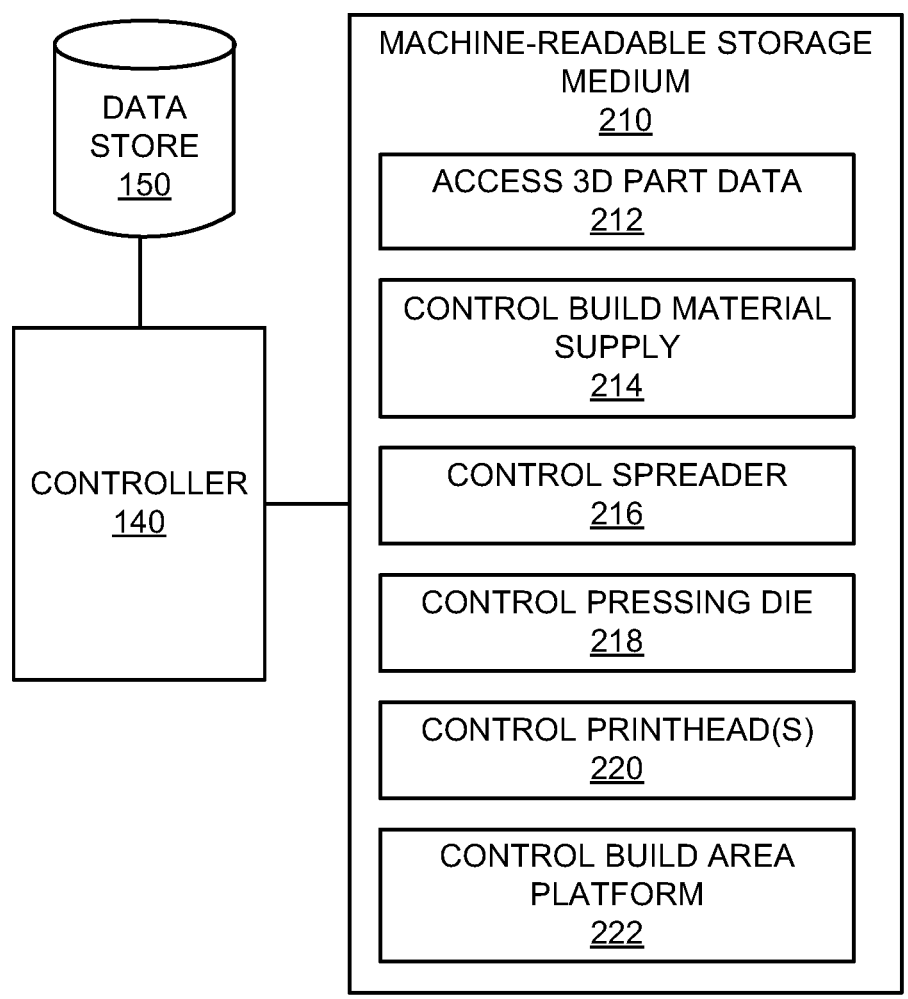
FIG. 2 shows a simplified block diagram of an example management apparatus that may be implemented in the 3D printer depicted in FIG. 1.

Turning now to FIG. 2, there is shown a simplified block diagram of an example management apparatus 200 that may be implemented in the 3D printer depicted in FIG. 1. In one example, the management apparatus 200 may form part of the 3D printer 100 depicted in FIG. 1. For instance, the management apparatus 200 may be a command module or other control system of the 3D printer 100. It should be understood that the management apparatus 200 depicted in FIG. 2 may include additional components and that some of the components described herein may be removed and/or modified without departing from a scope of the management apparatus 200 disclosed herein.

The management apparatus 200 depicted in FIG. 2 is shown as including a controller 140 and a data store 150, which may be the same as the controller 140 and data store 150 depicted in and described above with respect to FIG. 1. As such, the controller 140 and the data store 150 depicted in FIG. 2 are not described in detail and instead, the descriptions of the controller 140 and the data store 150 provided above with respect to the 3D printer 100 are intended to also describe these components with respect to the management apparatus 200.

As shown in FIG. 2, the management apparatus 200 may include a machine-readable storage medium 210 on which is stored machine readable instructions 212-222 that the controller 140 may execute. More particularly, the controller 140 may fetch, decode, and execute the instructions 212-224 to control processes including, access data pertaining to a 3D part to be printed 212, control the build material supply 214, control the spreader 216, control the pressing die 218, control the printhead 220, and control the build area platform 222. As an alternative or in addition to retrieving and executing instructions, the controller 140 may include one or more electronic circuits that include electronic components for performing the functionalities of the instructions 212-222. In any regard, and as discussed above, the controller 140 may communicate instruction signals to the various components of the 3D printer 100 via communication lines such that the components may operate in the manners described herein.

The machine-readable storage medium 210 may be any electronic, magnetic, optical, or other physical storage device that contains or stores executable instructions. Thus, the machine-readable storage medium 210 may be, for example, Random Access Memory (RAM), an Electrically Erasable Programmable Read-Only Memory (EEPROM), a storage device, an optical disc, and the like. The machine-readable storage medium 210 may be a non-transitory machine-readable storage medium, where the term "non-transitory" does not encompass transitory propagating signals.

Various manners in which the management apparatus 200 may be implemented are discussed in greater detail with respect to the methods 300 and 400 respectively depicted in FIGS. 3A-3F and 4A-4C. Particularly, FIGS. 3A-3F, collectively, depict an example method 300 for forming a cake or green body that may be formed into a 3D printed part using a 3D printer 100 and FIGS. 4A-4C, collectively, depict an example method 400 for forming a 3D printed part from the cake or green body. It should be apparent to those of ordinary skill in the art that the methods 300 and 400 may represent generalized illustrations and that other operations may be added or existing operations may be removed, modified, or rearranged without departing from the scopes of the methods 300 and 400.

The descriptions of the methods 300 and 400 are made with reference to the 3D printer 100 illustrated in FIG. 1 and the management apparatus 200 illustrated in FIG. 2 for purposes of illustration. It should, however, be clearly understood that 3D printers and management apparatuses having other configurations may be implemented to perform either of the methods 300 and 400 without departing from the scopes of the methods 300 and 400.

Prior to execution of the method 300 or as part of the method 300, the controller 140 may execute instructions 212 stored on the machine-readable medium 210 to access data pertaining to a 3D part that is to be printed. By way of example, the controller 140 may access data stored in the data store 150 pertaining to a 3D part that is to be printed. The controller 140 may determine the number of layers of build material granules 106 that are to be formed and the locations at which fusing agent from the printhead 130 is to be deposited on each of the respective layers of build material granules 106 in order to print the 3D part.

Figure 3A:
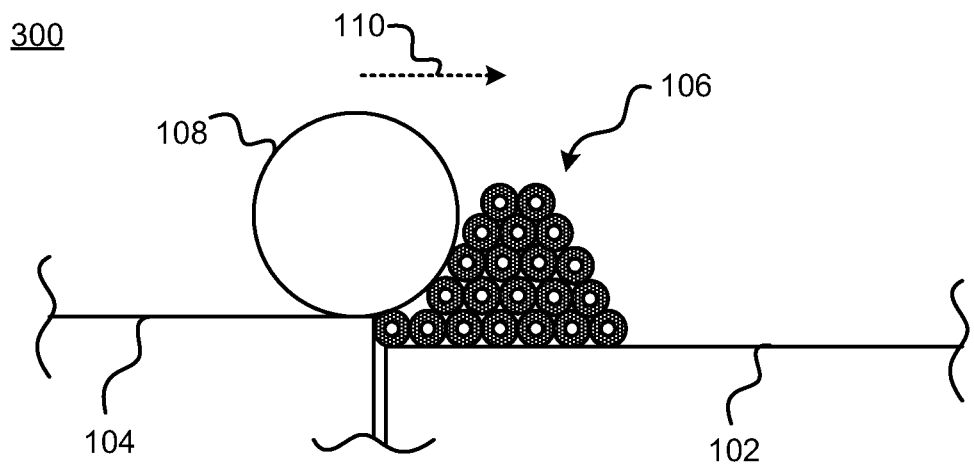
FIGS. 3A-3F, collectively, depict an example method for forming a cake or green body that may be formed into a 3D printed part using the 3D printer depicted in FIG. 1.
Figure 3B:
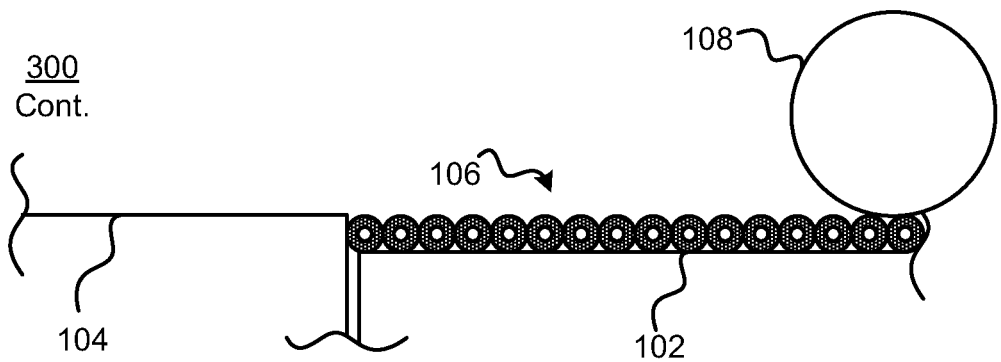

With reference first to FIG. 3A, the spreader 108 may spread build material granules 106 that have been supplied on the build material supply 104 onto the build area platform 102. Particularly, for instance, the controller 140 may execute the control build material supply instructions 214 to control the build material supply 104 to position build material granules 106 to be spread by the spreader 108 over the build area platform 102. In addition, the controller 140 may execute the control spreader instructions 216 to control the spreader 108 to spread the build material granules 106 supplied by the build material supply 104 over the build area platform 102 to form a layer of build material granules 106 on the build area platform 102, as shown in FIG. 3B, in which the layer has a substantially uniform thickness across the build area platform 102. In an example, the thickness of the layer ranges from about 90 μm to about 110 μm, although thinner or thicker layers may also be used. For example, the thickness of the layer 14 may range from about 20 μm to about 200 μm, or from about 50 μm to about 200 μm. Generally speaking, the layer thickness may be about 2× the granule diameter thickness at a minimum for finer part definition.

In an example, each build material granule 106 is composed of uncoated, primary ceramic particles and a thermally-decomposable organic binder (such as a polymer resin) that holds the primary ceramic particles together. The build material granules 106 are large enough (e.g., ≥10 μm) to enable thin layers with well controlled uniformity to be formed during spreading. For instance, the build material granules 106 have a granule size ranging from about 10 μm to about 200 μm. In another example, the granule size ranges from about 20 μm to about 150 μm. The term "granule size" is used herein to describe the build material granules 106. The granule size may generally refer to the diameter or average diameter of the composite build material granule 106, which may vary depending upon the morphology of the composite. In an example, a respective build material granule 106 may have a morphology that is substantially spherical. A substantially spherical granule 106 (i.e., spherical or near-spherical) may have a sphericity of >0.84. Thus, any individual granules 106 having a sphericity of <0.84 are considered non-spherical (irregularly shaped). The granule size of the substantially spherical granule 106 may be provided by its largest diameter, and the granule size of a non-spherical granule 106 may be provided by its average diameter (i.e., the average of multiple dimensions across the granule 106) or by an effective diameter, which is the diameter of a sphere with the same mass and density as the non-spherical granule 106.

In some examples, the build material granule 106 has a hollow center as shown in FIG. 3A. In other examples, the build material granule 106 has a substantially filled in center. The uncoated, primary ceramic particles forming the build material granule 106 may be any bare ceramic particles. The bare ceramic particles do not have a coating, such as a chromophore coating, thereon. Examples of suitable uncoated, primary ceramic particles include metal oxides, inorganic glasses, carbides, nitrides, and borides. Some specific examples include alumina ($Al_2O_3$), $Na_2O$/$CaO$/$SiO_2$ glass (soda-lime glass), silicon carbide (SiC), silicon nitride (Si3N4), silicon dioxide ($SiO_2$), zirconia ($ZrO_2$), yttrium oxide-stabilized zirconia (YTZ), titanium dioxide ($TiO_2$), or combinations thereof. As an example of one suitable combination, 30 wt % glass may be mixed with 70 wt % alumina.

In an example, the particle size of the uncoated, primary ceramic particles 40 ranges from 0.01 μm to about 3 μm. In another example, the particle size ranges from 0.05 μm to about 1.5 μm. The term "particle size" is used herein to describe the uncoated, primary ceramic particle. The particle size may generally refer to the diameter or average diameter of the uncoated, primary ceramic particle, which may vary, depending upon the morphology of the particle. In an example, a respective uncoated, primary ceramic particle may have a morphology that is substantially spherical. A substantially spherical particle (i.e., spherical or near-spherical) may have a sphericity of >0.84. Thus, any individual particles having a sphericity of <0.84 are considered to be non-spherical (irregularly shaped). The particle size of the substantially spherical uncoated, primary ceramic particle may be provided by its largest diameter, and the particle size of a non-spherical uncoated, primary ceramic particle may be provided by its average diameter (i.e., the average of multiple dimensions across the particle 40) or by an effective diameter, which is the diameter of a sphere with the same mass and density as the non-spherical particle.

The ceramic particles may be similarly sized particles or differently sized particles. Additionally, the binder that holds the primary ceramic particles together may be any material that i) has enough adhesive strength to hold the uncoated, primary ceramic particles together to form the granules 106 with enough mechanical stability to survive limited handling (e.g., spreading the build material granules 106 into layers), and ii) in which the adhesive strength is to deteriorate in the presence of a sufficient level of heat, (e.g., application of heat at a first temperature as discussed below).

The binder may be a polymer resin with clean thermal decomposition mechanism (e.g., leaves <5 wt % solid residue of the initial binder and preferably <1 wt % solid residue of the initial binder). Examples of such suitable polymer resin binders may include acrylic polymers, their co-polymers with styrene moieties, polyether resins, and so on, that meet the criteria i and ii discussed above. In an alternative implementation, the binder may be a small molecular species or a short chain polymer that meets the criteria i and ii. Examples of suitable binders may include sugars, sugar alcohols, polymeric or oligomeric sugars, low or moderate molecular weight polycarboxylic acids, polysulfonic acids, water soluble polymers containing carboxylic or sulfonic moieties, and polyether alkoxy silane. Some specific examples include glucose ($C_6H_{12}O_6$), sucrose ($O_{12}H_{22}O_{11}$), fructose ($C_6H_{12}O_6$), maltodextrines with a chain length ranging from 2 units to 20 units, sorbitol ($C_6H_{14}O_6$), erythritol ($C_4H_{10}O_4$), mannitol ($C_6H_{14}O_6$), or CARBOSPERSE® K7028 (a short chain polyacrylic acid, M~2,300 Da, available from Lubrizol). Low or moderate molecular weight polycarboxylic acids (e.g., having a molecular weight less than 5,000 Da) may dissolve relatively fast. It is to be understood that higher molecular weight polycarboxylic acids (e.g., having a molecular weight greater than 5,000 Da up to 10,000 Da) may be used, however the dissolution kinetics may be slower.

In an example, the binder is present in each granule 106 in an amount ranging from about 0.1 wt % to about 10 wt % based on the wt % of the primary ceramic particles in each granule 106. In another example, the binder is present in each granule 106 in an amount ranging from about 0.3 wt % to about 5 wt % based on the wt % of the primary ceramic particles in each granule 106.

It is to be understood that in some instances the build material granules 106 are formed of the uncoated, primary ceramic particles and binder alone. In other instances, a charging agent or a flow aid may be added in between the build material granules 106. Charging agent(s) may be added to suppress tribo-charging. Examples of suitable charging agent(s) include aliphatic amines (which may be ethoxylated), aliphatic amides, quaternary ammonium salts (e.g., behentrimonium chloride orcocamidopropyl betaine), esters of phosphoric acid, polyethylene glycolesters, or polyols. Some suitable commercially available charging agents include HOSTASTAT® FA 38 (natural based ethoxylatedalkylamine), HOSTASTAT® FE2 (fatty acid ester), and HOSTASTAT® HS 1 (alkane sulfonate), each of which is available from Clariant Int. Ltd.). In an example, the charging agent is added in an amount ranging from greater than 0 wt % to less than 5 wt % based upon the total wt % of the build material 12.

Flow aid(s) may be added to improve the coating flowability of the build material granules 106. Flow aid(s) may be particularly beneficial when the build material granules 106 are less than 25 μm in granule size. The flow aid generally improves the flowability of the build material granules 106 by reducing the friction, the lateral drag, and the tribocharge buildup (by increasing the particle conductivity). Examples of suitable flow aids include tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), or polydimethylsiloxane (E900). In an example, the flow aid is added in an amount ranging from greater than 0 wt % to less than 5 wt % based upon the total wt % of the build material granules 12.

While not shown in FIG. 3A, the method 300 may further include preparing the build material granules 106. In one example, the build material granules 106 are prepared by dispersing the uncoated, primary ceramic particles in a solution containing the binder. The solution may be based on water or a high vapor pressure solvent (e.g., isopropyl alcohol, ethanol, acetone, etc.) as the primary solvent. The solution containing the uncoated, primary ceramic particles dispersed therein may then be spray dried. The solution may be passed through a spray nozzle or jet nebulizer (i.e., atomizer) at high pressure to create a high velocity mist (or aerosol) consisting of the solution droplets containing the uncoated, primary ceramic particles and binder. The droplets may dry quickly (e.g., in less than 1 minute) to form the granular agglomerates that make up the build material granules 106. The spray drying process parameters, such as spraying nozzle diameter (e.g., ranging from 2 mm to 3 mm), solution pumping rate (e.g., ranging from 100 g/min to 200 g/min for a lab scale spray drier), inlet and outlet air temperatures (e.g., ranging from 60° C. to 150° C.), pH of the solution, % of solid content, etc. may be altered to control the size distribution and/or morphology of the build material granules 106. The build material granules 106 may also be formed in through implementation of other granulation processes, such as a fluidized bed approach, etc.

According to an example, the build material granules 106 have sizes that are greater than about 10 µm, for instance, between about 10 to about 75 µm. In one regard, the build material granules 106 have sizes that are greater than about 10 µm because the ability of the build material granules 106 to be spread into thin layers with well controlled uniformity may affect the precision and quality of the 3D part that is formed. Build material granules that are less than 5 µm to 10 µm in size tend to form irregularly-shaped clumps due to strong Van Der Waals attraction between the particles. This clumping of build material granules degrades its ability to spread in to thin layers, and fusing agent may not be able to spread uniformly among the build material, which may lead to 3D parts having imprecise shapes, varying structural properties, structural defects and/or varying visual qualities. Build material particles of at least 10 µm in size, and having a shape close to spherical, tend to spread well.

However, build materials, especially ceramic build materials, with such a large particle size may be unable to be sintered efficiently. Ceramic particles tend to have very high melting temperatures (e.g., greater than 1000° C.). Therefore, in 3D printing, ceramic particles are usually sintered (which may involve prolonged heating to temperatures ranging from about 60% to about 80% of the ceramic particle's melting temperature) rather than melted. Sintering is a diffusion based process, and therefore, sintering speed is dependent on the primary particle size. For the majority of ceramic materials, the sintering rate is inversely proportional to the material particle diameter in a power ranging from 2 to 4. Thus, an increase in build material granule diameter from 1 µm to 10 µm should slow down its sintering rate by a factor of $10^2$ to $10^4$. For the above reason, the sintering speed for ceramic build material granules with a particle size of few (1-10) µm or greater is impractically slow (e.g., months to years) for use in 3D printing. Additionally, 3D parts sintered from large, ceramic particles (e.g., greater than 10 µm) tend to be highly porous structures with larger inter-particle voids and tend to have compromised mechanical strength (e.g., less than 10% of bulk strength).

Heating large, ceramic build material granules at or slightly below the melting temperature may accelerate the fusing of the ceramic build material granules. However, if the melting temperature is exceeded, the ceramic build material granules may completely melt down leading to distorted parts (i.e., parts that have lost their shape). Additionally, heating at or slightly below the melting temperature may lead to rapid redistribution of the ceramic build material granules, which may consolidate inter-particle voids into larger inter-particle voids. The resulting part may have compromised structural uniformity and mechanical strength.

Examples of the method and system disclosed herein may utilize substantially spherical, granular ceramic build material granules. In these examples, the ceramic build material granules may be composed of uncoated, primary ceramic particles and a binder that holds the primary ceramic particles together. The build material granules 106 are sufficiently large (e.g., ≥10 µm) to enable thin layers with well controlled uniformity to be formed during spreading. By way of particular example, the build material granules 106 are made up of sub-micron sized Alumina particles and are bound together to form a granule of between about 10-75 µm in diameter. In addition, the layer of build material granules 106 may be formed to have a height that is about 100 µm and the build material granules 106 may be held in place by an organic binder.

According to an example, the build material granules 106 may be pressed in order to fragment, e.g., break up, the build material granules 106 into primary particles following formation of the build material granules 106 into a layer on the build area platform 102. By way of example, sufficient force may be applied onto the layer of build material granules 106 to cause the binder between the primary particles of the build material granules 106 to cease binding the primary particles together such that inter-granule voids between the build material granules 106 may be reduced or eliminated.

Figure 3C:
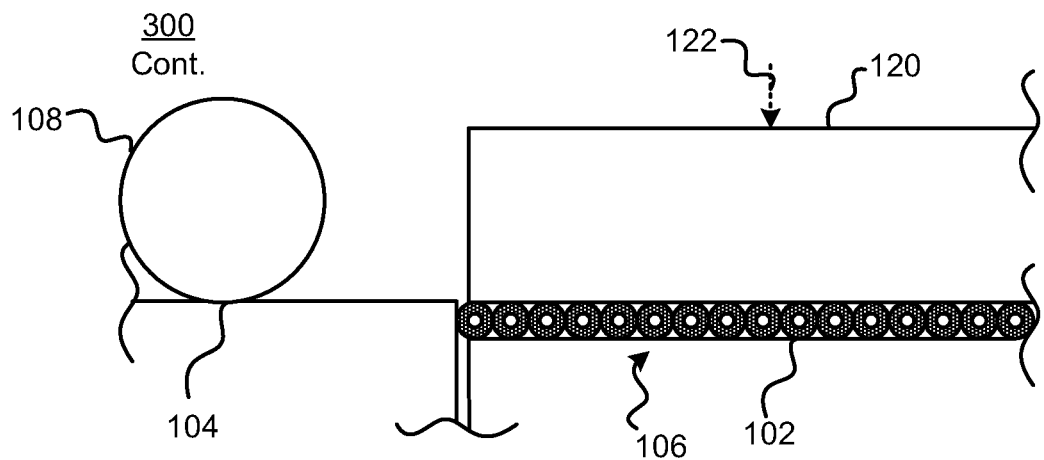

In one example, and as shown in FIG. 3C, the pressing die 120 may be moved in the direction indicated by the arrow 122 such that the pressing die 120 is positioned on top of the layer of build material granules 106. Particularly, for instance, the controller 140 may execute the control pressing die instructions 218 to control the pressing die 120 to apply pressure onto the layer of build material granules 106. Through application of the pressure by the pressing die 120 and an opposing pressure applied by the build area platform 102, the density of the build material granules 106 in the layer of build material granules 106 may be increased. That is, for instance, the build material granules 106 may be crushed, broken up, pulverized, or the like, as the pressing die 120 applies sufficient pressure onto the build material granules 106. The amount of pressure sufficient to increase the density of the build material granules 106 to a predefined level may depend upon the types of materials from which the build material granules 106 are form and may be determined through testing.

In other examples, the build material granules 106 may be densified in other manners. For instance, instead of moving the pressing die 128 in the direction denoted by the arrow 122, the build area platform 102 may be moved in a direction opposite direction denoted by the arrow 122, i.e., the build area platform 102 may be moved toward the pressing die 120 such that pressure is applied onto the build material granules 106 by the movement of the build area platform 102. In another example, the spreader 108 may apply pressure to densify the build material granules 106 to the predefined level. In this example, the spreader 108 may apply the sufficient amount of pressure during an initial pass over the build area platform 102 or during a second or subsequent pass over the build area platform 102, e.g., during a return trip back to the a position over the build material supply 104.

In any of the examples discussed above, the pressing of the build material granules 106 may consolidate the sub-micron particles forming the build material granules 106 to be in close contact with each other and increase the density of the layer of build material granules 106, which may improve a density of the final printed part. The pressed build material granules 106 may also be in a form that is more receptive to receive the fusing agent from the printhead 130 and may enable finer part feature control without disturbance of the build material granules 106.

Figure 3D:
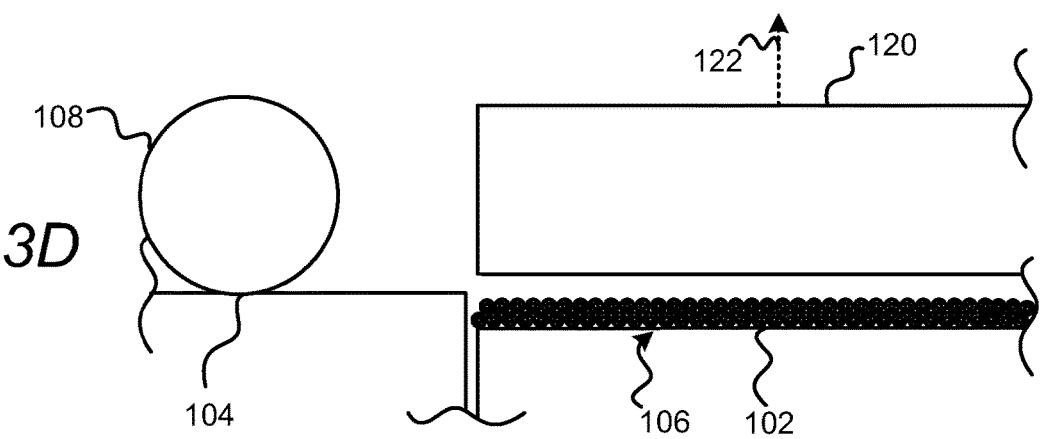

Turning now to FIG. 3D, there is shown an example of a layer of the build material granules 106 following application of pressure onto the build material granules 106. As shown in that figure, the build material granules 106 are depicted as having been fragmented into the primary particles and thus having relatively smaller sizes as compared to the build material granules 106 shown in FIGS. 3A-3C.

Additionally, the pressing die 120 is depicted as being moved away from the layer of build material granules 106 in the direction denoted by the arrow 122.

Figure 3E:
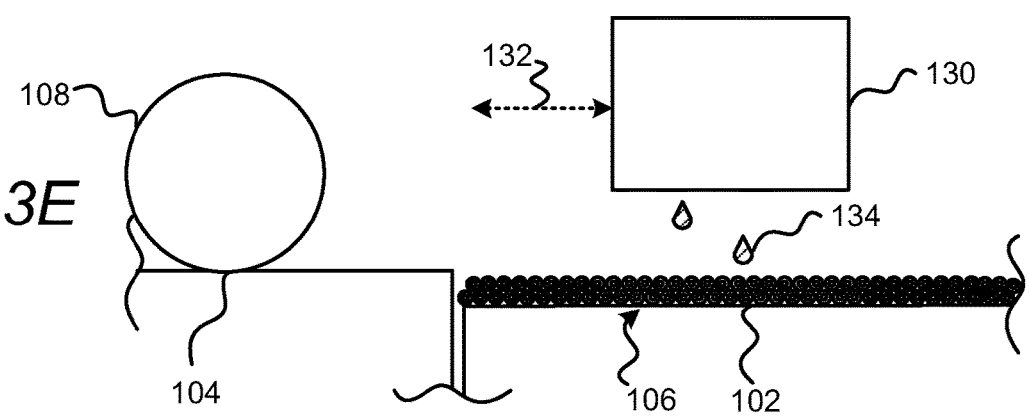
Figure 3F:
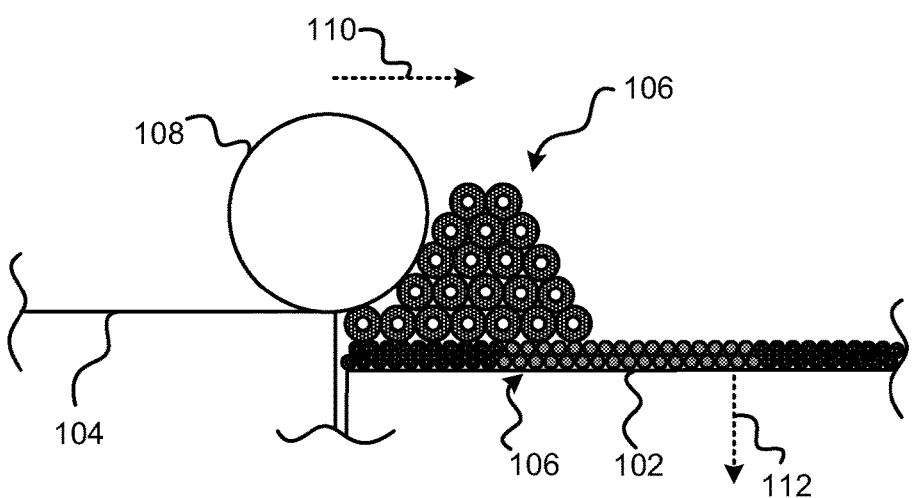

With reference now to FIG. 3E, the controller 140 may execute the instructions 220 to control the printhead 130 to deposit fusing agent 134 onto predetermined locations on the layer of build material granules 106. For instance, the controller 140 may control the printhead 130 to deposit fusing agent 134 onto locations of the layer of build material granules 106 containing the primary particles that are to be fused together or otherwise solidified as determined from the accessed 3D part data. That is, the primary particles of the build material granules 106 that receive the fusing agent 134 are to be bonded together with a relatively higher strength as compared to the bond between the primary particles of the build material granules 106 that have not received the fusing agent 134. As discussed in greater detail herein below, the bonding between the primary particles that have received the fusing agent 134 over the build material granules 106 that have not received the fusing agent 134 may be increased through the application of heat. In FIG. 3E, the sections of the layer of build material granules 106 that have received the fusing agent 134 are depicted as having a lighter shade as compared with the sections of the layer of build material granules 106 that have not received the fusing agent 134. According to a particular example in which the build material granules 106 are formed of Alumina particles, the fusing agent 134 may be an ink containing $SiO_2$.

In another example, the fusing agent 134 includes active material, such as metal nanoparticles. In one example, the metal nanoparticles are silver (Ag), copper (Cu), or zinc (Zn). Other examples of suitable metal nanoparticles include metal alloys (where the metals are selected from, for example, Ag, Au, Cu, Ni, Rh, Ru, Mo, Ta, Ti, Pt, or Pd), metal oxide (e.g., iron oxide), metal coated oxide (e.g., iron oxide coated with Ag, Au or Pt), cadmium selenide, and metal coated silica (e.g., silica coated with Ag or Au).

The amount of the active material that is present in the fusing agent 134 may range from 0 wt % to about 40 wt % based on the total wt % of the fusing agent 134. In other examples, the amount of the active material in the fusing agent 134 may range from about 0.3 wt % to 30 wt %, or from about 1 wt % to about 20 wt %.

The presence of a co-solvent, a surfactant, and/or a dispersant in the fusing agent 134 may assist in obtaining a particular wetting behavior with the build material granules 106. In some instances, the fusing agent 134 includes water or other primary solvent, either alone or with the active material. In other instances, the fusing agent 134 may further include a dispersing additive, a surfactant, a co-solvent, a biocide, an anti-kogation agent, and combinations thereof.

Surfactant(s) may be used to improve the wetting properties and the jettability of the fusing agent 134. Examples of suitable surfactants may include a self-emulsifiable, non-ionic wetting agent based on acetylenic diol chemistry (e.g., SURFYNOL® SEF from Air Products and Chemicals, Inc.), a nonionic fluorosurfactant (e.g., CAPSTONE® fluorosurfactants from DuPont, previously known as ZONYL FSO), and combinations thereof. In other examples, the surfactant is an ethoxylated low-foam wetting agent (e.g., SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other suitable surfactants include non-ionic wetting agents and molecular defoamers (e.g., SURFYNOL® 104E from Air Products and Chemical Inc.) or water-soluble, non-ionic surfactants (e.g., TERGITOL™ TMN-6 from The Dow Chemical Company). In some examples, it may be desirable to utilize a surfactant having a hydrophilic-lipophilic balance (HLB) less than 10.

Whether a single surfactant is used or a combination of surfactants is used, the total amount of surfactant(s) in the fusing agent 134 may range from about 0.5 wt % to about 1.4 wt % based on the total wt % of the fusing agent 26.

Some examples of the co-solvent (for the water-based fusing agent 26) include 1-(2-hydroxyethyl)-2-pyrollidinone, 2-Pyrrolidinone, 1,5-Pentanediol, Triethylene glycol, Tetraethylene glycol, 2-methyl-1,3-propanediol, 1,6-Hexanediol, Tripropylene glycol methyl ether, N-methylpyrrolidone, Ethoxylated Glycerol-1 (LEG-1), and combinations thereof.

Examples of suitable biocides include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from The Dow Chemical Co.). The biocide or antimicrobial may be added in any amount ranging from about 0.05 wt % to about 0.5 wt % with respect to the total wt % of the fusing agent 134.

An anti-kogation agent may be included in the fusing agent 134. Kogation refers to the deposit of dried ink (e.g., fusing agent 134) on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAFOS™ O3A or CRODAFOS™ N-3 acid from Croda), or a combination of oleth-3-phosphate and a low molecular weight (e.g., <5,000) polyacrylic acid polymer (e.g., commercially available as CARBOSPERSE™ K-7028 Polyacrylate from Lubrizol). Whether a single anti-kogation agent is used or a combination of anti-kogation agents is used, the total amount of anti-kogation agent(s) in the fusing agent 134 may range from greater than 0.20 wt % to about 0.62 wt % based on the total wt % of the fusing agent 134. In an example, the oleth-3-phosphate is included in an amount ranging from about 0.20 wt % to about 0.60 wt %, and the low molecular weight polyacrylic acid polymer is included in an amount ranging from about 0.005 wt % to about 0.015 wt %.

It is to be understood that a single fusing agent 134 may be selectively applied to form the layer of the 3D part, or multiple fusing agents 134 may be selectively applied to form the layer of the 3D part.

According to an example, the controller 140 may control the printhead 130 to deposit the fusing agent 134, e.g., which may be a fusing agent, according to a pattern of a cross-section for the layer of the 3D part that is to be formed. For instance, the controller 140 may control the printhead 130 to selectively apply the fusing agent 134 on those portion(s) of the layer of build material granules 106 that are to be fused together to become the first layer of the 3D part. As an example, if the 3D part that is to be formed is to be shaped like a cube or cylinder, the fusing agent 134 may be deposited in a square pattern or a circular pattern (from a top view), respectively, on at least a portion of the layer of the build material granules 106.

Following deposition of the fusing agent 134 onto predetermined locations of the layer of build material granules 106, the controller 140 may execute the instructions 222 to control the build area platform 102 to cause the build area platform 102 to be moved a relatively small distance in the direction denoted by the arrow 112. In other words, the build area platform 102 may be lowered to enable a next layer of build material granules 106 to be formed, e.g., a distance that is equivalent to the height of the layer of build material granules 106, for instance, about 100 microns. In addition, following the lowering of the build area platform 102, the controller 140 may control the build material supply 104 to supply additional build material granules 106 (e.g., through operation of an elevator, an auger, or the like) and the spreader 108 to form another layer of build material granules 106 on top of the previously formed layer of build material granules 106 with the additional build material granules 106. In addition, the method 300 depicted in FIGS. 3A-3E may be repeated for the another layer of build material granules 106. Furthermore, the method 300 depicted in FIGS. 3A-3F may be repeated for additional layers of build material granules 106 that have been determined to be needed for the formation of the 3D part.

Although the method 300 has been described with the layer of build material granules 106 being pressed prior to receiving the fusing agent 134, it should be understood that the method 300 may additionally or alternatively include applying the fusing agent 134 onto the layer of build material granules 106 and then pressing the layer with the pressing die 120. In this example, pressing of the layer after the fusing agent 134 has been deposited may enhance penetration of the fusing agent 134 between the primary particles.

Figure 4A:
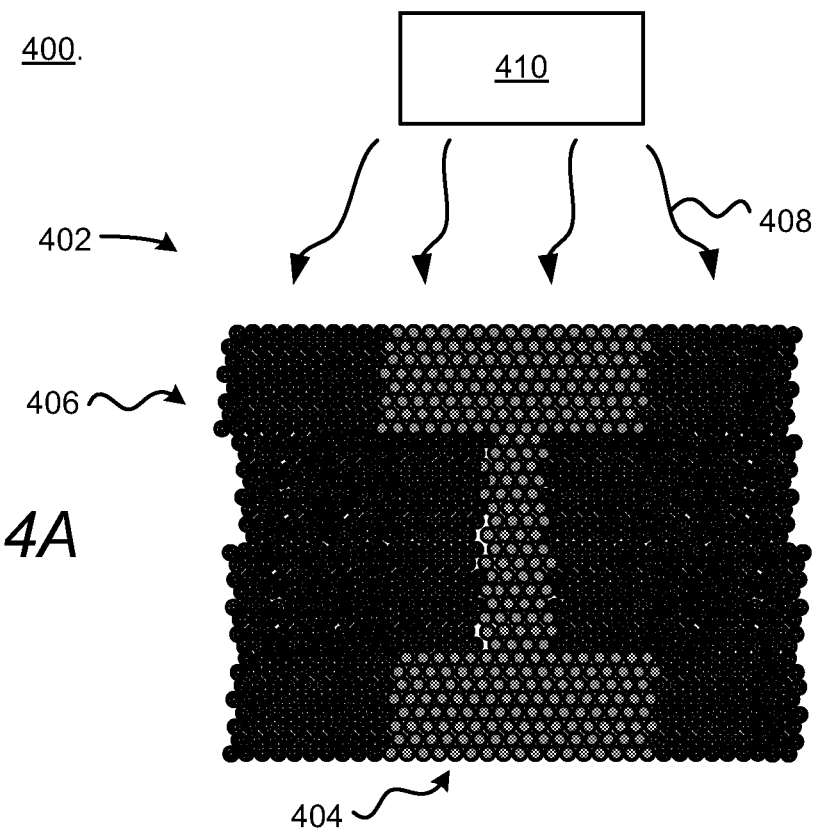
FIGS. 4A-4C, collectively, depict an example method for forming a 3D printed part from the cake or green body formed through implementation of the method depicted in FIGS. 3A-3F.
Figure 4B:
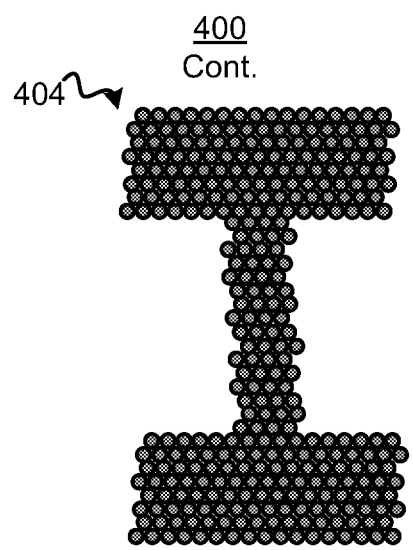
Figure 4C:
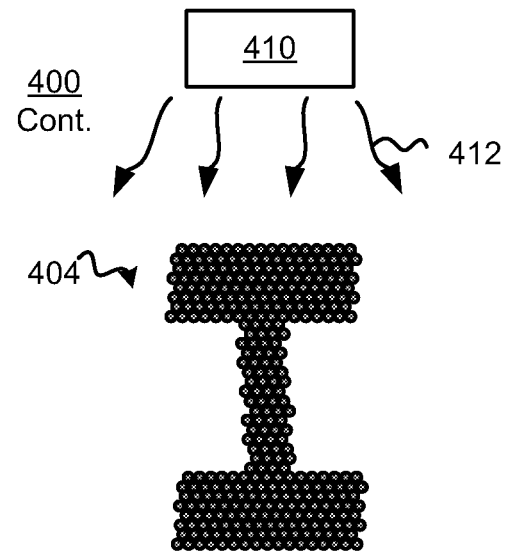

With reference now to FIGS. 4A-4C, there are collectively shown an example method 400 for completing formation of a 3D printed part. Particularly, FIGS. 4A-4C, collectively, depict an example method 400, which may be performed following the formation completion of the method 300 on a predetermined number of layers of build material granules 106. As shown in FIG. 4A, following completion of the method 300, a cake 402 of build material granule 106 layers, which may also be referred to as a green body, may be created. The cake 402 may be formed of sections 404 of build material granules 106 that have received fusing agent 134 from the printhead 130 and sections 406 of build material granules 106 that have not received the fusing agent 134.

As also shown in FIG. 4A, heat or radiation may be applied to the cake 402 of build material granule 106 layers (e.g., green body), as denoted by the arrows 408. In one example, a heat source 410 may apply heat to the cake 402. In this example, the cake 402 may be removed from the build area platform 402 prior to being heated by the heat source 410. In addition, the heat source 410 may be a heating chamber, such as a furnace or oven and the cake 402 may be placed inside the heat source 410. Examples of the heat source 410 may include a furnace or oven, a microwave (which may also be considered a radiation source), or hybrid heating devices (i.e., heating and microwave heating). Examples of a radiation source may include a UV, IR or near-IR curing lamp, IR or near-IR light emitting diodes (LED), halogen lamps emitting in the visible and near-IR range, or lasers with the desirable electromagnetic wavelengths. When a radiation source is used, the type of radiation source will depend, at least in part, on the type of active material used in the fusing agent 134.

According to an example, the heat source 410 may apply heat at a temperature that causes formation of bonds between the primary particles of the build material granules 106 upon which the fusing agent 134 has been deposited and that causes a binder between the primary particles of the build material granules 106 that have not received the fusing agent 134 to evaporate (e.g., burn out). By way of particular example in which the build material granules 106 are Alumina granules and the fusing agent 134 includes silicon dioxide ($SiO_2$) particles of approximately 2 nm in size, application of heat at around 500° C., may cause bonds to be formed. As such, application of the heat or radiation as shown in FIG. 4A may cause the sections 404 of the cake 402 that have received the fusing agent 134 to have an increased strength as compared with the sections 406 of the cake 402 that have not received the fusing agent 134. In addition, the application of heat may cause the binder in the build material granules 106 contained in the sections 406 of the cake 402 to be burned out and thus, the bonds between those build material granules 106 may be weakened.

As shown in FIG. 4B, the sections 406 of the cake 402 that have not received the fusing agent 134 may be removed from the cake 402. For instance, the sections 406 of the cake 402 that have not received the fusing agent 134 may be blasted away from the sections 404 of the cake 402 that have received the fusing agent 134. By way of particular example, the cake 402 may be placed in a media blasting cabinet (not shown) and the sections 406 may be sandblasted away from the sections 404. As another example, the sections 406 may be removed through mechanical vibration or other removal techniques. As discussed above, through application of the heat as shown in FIG. 4A, the sections 404 may have a relatively stronger bond to each other than the sections 406 and the bonds in the sections 406 may have been weakened and thus, the sections 406 may be removed from the cake 402 more readily than the sections 404.

As shown in FIG. 4C, heat or radiation may be applied to the sections 404 as denoted by the arrows 412 from a heat or radiation source 410. The temperature at which the heat 412 is applied may be significantly higher than the temperature at which the heat 408 is applied as shown in FIG. 4A. According to an example, the temperature of the heat applied as shown in FIG. 4C may be sufficiently high to sinter the build material granules 106 in the sections 404. By way of example, the temperature of the heat 412 may be above around 1000° C. and in other examples, above around 1500° C. In addition, application of the heat 412 as shown in FIG. 4C may cause the density of the sections 404 to be increased, which may also cause the sections 404 to shrink. The length of time at which the heat 412 is applied may be dependent, for example, on one or more of: characteristics of the heat or radiation source 410, characteristics of the build material granules 106 (e.g., ceramic particles); and/or characteristics of the fusing agent 134.

During heating/sintering, the sections 404 may be heated to a temperature ranging from about 40% to about 90% of the melting temperature of the primary ceramic particles. In an example, the sections 404 may be heated to a temperature ranging from about 50% to about 80% of the melting temperature of the primary ceramic particles. The heating temperature thus depends, at least in part, upon the primary ceramic particles that are utilized. The heating temperature may also depend upon the particle size and time for sintering (i.e., high temperature exposure time). In some examples, the heating temperature of the sections 404 ranges from about 900° C. to about 2000° C., or from about 1400° C. to about 1700° C. The heating shown in FIG. 4C is to sinter and fuse the primary ceramic particles to form a completed 3D part, which may be even further densified relative to the sections 404.

Although not shown, the operations depicted in FIGS. 4A-4C may be automated and the controller 140 may control the operations.

Some or all of the operations set forth in the methods 300 and 400 may be contained as utilities, programs, or subprograms, in any desired computer accessible medium. In addition, the methods 300 and 400 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A three-dimensional (3D) printer comprising:
   a spreader to spread build material granules into a layer on a build area platform;
   a pressing die positioned above the layer of spread build material granules;
   a controller to operate the pressing die, wherein the controller is programmed to control the pressing die to apply pressure onto the layer of build material granules sufficient to fragment a majority of the build material granules into primary particles to increase the density of the layer of build material granules; and
   a printhead to selectively deposit a fusing agent between the primary particles of the spread layer of build material granules.

2. The 3D printer according to claim 1, wherein the controller is to control the build area platform, the spreader, and the pressing die to iteratively form multiple layers of build material granules which are spread by the spreader, pressed by the pressing die, and have received the deposited fusing agent.

3. The 3D printer according to claim 1, further comprising:
   a heater to apply heat at a first temperature to the multiple layers of build material granules to cause the primary particles upon which the fusing agent has been deposited to have a higher level of bonding with each other as compared to the primary particles upon which the fusing agent has not been deposited.

4. The 3D printer according to claim 1, wherein the build material granules comprise ceramic build material granules and wherein the pressing die is to apply a sufficient level of pressure to fragment a majority of the ceramic build material granules into primary ceramic particles.

5. A method comprising:
   a) spreading build material granules into a layer on a build area platform;
   b) applying pressure onto the layer of spread build material granules to fragment the build material granules into primary particles to increase the density of the layer of build material granules; and
   c) depositing a fusing agent into selected areas of the layer of spread build material granules, wherein the fusing agent is to facilitate binding of the primary particles in the selected areas to each other.

6. The method according to claim 5, further comprising:
   repeating a)-c) until a green body formed of a predetermined number of layers of build material granules has been spread, pressed, and received the deposited fusing agent.

7. The method according to claim 6, further comprising:
   applying heat at a first temperature to the layers of build material granules to cause the primary particles upon which the fusing agent has been deposited to have a higher level of bonding with each other as compared to the primary particles upon which the fusing agent has not been deposited;
   removing the primary particles that have not received the fusing agent from the primary particles that have received the fusing agent; and
   applying heat at a second temperature to the primary particles that have received the fusing agent, wherein the second heat is to enable sintering and densification of the primary particles between which the fusing agent has been deposited.

8. The method according to claim 6, further comprising:
   lowering the build area platform and supplying additional build material granules between successive performances of a) through c).

9. The method according to claim 5, further comprising:
   performing c) prior to performing b).

10. The method according to claim 5, wherein spreading the layer of build material granules further comprises spreading a layer of ceramic build material granules onto the build area platform.

11. The method according to claim 10, wherein applying pressure onto the layer of spread build material granules further comprises causing a pressing die having a flat surface to be pressed onto a top section of the layer of ceramic build material granules such that the layer of ceramic build material granules receives compressive force between the pressing die and the build area platform.

12. The method according to claim 11, wherein causing the pressing die to be pressed onto the top section of the layer of ceramic build material granules further comprises causing the pressing die to be pressed with a sufficient level of force to cause a majority of the ceramic build material granules in the layer of ceramic build material granules to be fragmented.

13. The method according to claim 5, wherein depositing the fusing agent further comprises depositing the fusing agent via an inkjet delivery mechanism.

14. The method according to claim 5, wherein the build material granules have a size of 10 μm or more and applying the pressure to fragment the build material granules results in primary particles of 0.5 μm or less that have been fragmented from the granules.

15. The method according to claim 5, wherein the build material granules comprise primary ceramic particles and a thermally-decomposable organic binder, the method further comprising:

repeatedly spreading build material, applying the pressure and depositing the fusing agent to selected areas to form a cake that comprises multiple layers of build material, some of the build material treated with fusing agent and a remainder of the build material not receiving fusing agent;

heating the cake to remove the thermally-decomposable organic binder from the cake; and removing build material from the cake that has not received the fusing agent.

16. The method according to claim 15, wherein heating the cake is performed so as to form bonds between the primary particles upon which the fusing agent has been deposited as well as removing the organic binder.

17. The method according to claim 15, further comprising sintering remaining build material that received fusing agent in a furnace.

18. The method according to claim 15, where removing the build material from the cake that has not received the fusing agent comprises sandblasting the cake to remove the build material that has not received the fusing agent.

19. The method according to claim 15, where removing the build material from the cake that has not received the fusing agent comprises applying mechanical vibration to the cake to remove the build material that has not received the fusing agent.

20. A management apparatus comprising:

a controller; and machine readable instructions that are to cause the controller to:
control a spreader to spread ceramic build material granules into a layer onto a build area platform;
control a pressing die to apply a sufficient level of pressure onto the layer of ceramic build material granules to cause a majority of the ceramic build material granules to be fragmented and thereby increase a density of the layer of ceramic build material granules; and
control a printhead to deposit a fusing agent at predetermined locations between the crushed ceramic build material granules.

21. The management apparatus according to claim 20, wherein the machine readable instructions are further to cause the controller to:
one of:
control the pressing die to apply pressure onto the layer of ceramic build material granules prior to control of the printhead to deposit the fusing agent; and
control the printhead to deposit the fusing agent onto the layer of ceramic build material granules prior to control the pressing die to apply pressure onto the layer of ceramic build material granules.

* * * * *